United States Patent

Sato

[11] Patent Number: 5,620,389
[45] Date of Patent: Apr. 15, 1997

[54] PARALLEL-AXIS DIFFERENTIAL

[75] Inventor: Hideyuki Sato, Saitama-ken, Japan

[73] Assignee: Zexel Corporation, Tokyo, Japan

[21] Appl. No.: 531,051

[22] Filed: Sep. 20, 1995

[30] Foreign Application Priority Data

Oct. 13, 1994 [JP] Japan ................................. 6-274387

[51] Int. Cl.⁶ ................................................. F16H 3/44
[52] U.S. Cl. ........................... 475/249; 475/160; 74/462
[58] Field of Search ................................. 975/226, 249, 975/252, 344; 74/425, 458, 410, 462; 464/109, 157, 158, 159; 475/159, 160

[56] References Cited

U.S. PATENT DOCUMENTS

| 4,777,838 | 10/1988 | Aarestad | 74/462 X |
| 5,194,054 | 3/1993 | Amborn et al. | |
| 5,433,673 | 7/1995 | Cilano | 475/249 X |

FOREIGN PATENT DOCUMENTS

| B-23192/92 | 2/1993 | Australia | 475/226 |
| 6-249301 | 9/1994 | Japan | 475/226 |
| WO94/1622 | 9/1994 | WIPO | 475/226 |
| WO94/27063 | 11/1994 | WIPO | 475/226 |

*Primary Examiner*—Rodney H. Bonck
*Assistant Examiner*—Saul J. Rodriguez

[57] ABSTRACT

In a parallel-axis differential, pocket pairs are formed in an inner periphery of a housing and planetary gear pairs are rotatably received in the pocket pairs, respectively. With outer peripheral surfaces of the planetary gears (i.e., top faces of helical teeth) being in contact with inner peripheral surfaces of the pockets, the planetary gears are rotated relative to the housing. End portions of the helical teeth located on opposite end portions of each planetary gear are gradually reduced in height toward ends of the planetary gear. By this, top faces of end portions of those helical teeth are slightly convexly curved. The top faces of the end portions of those helical teeth are served as contact surfaces which are brought into contact with the inner peripheral surfaces of the pockets when the planetary gears are slightly inclined.

5 Claims, 3 Drawing Sheets

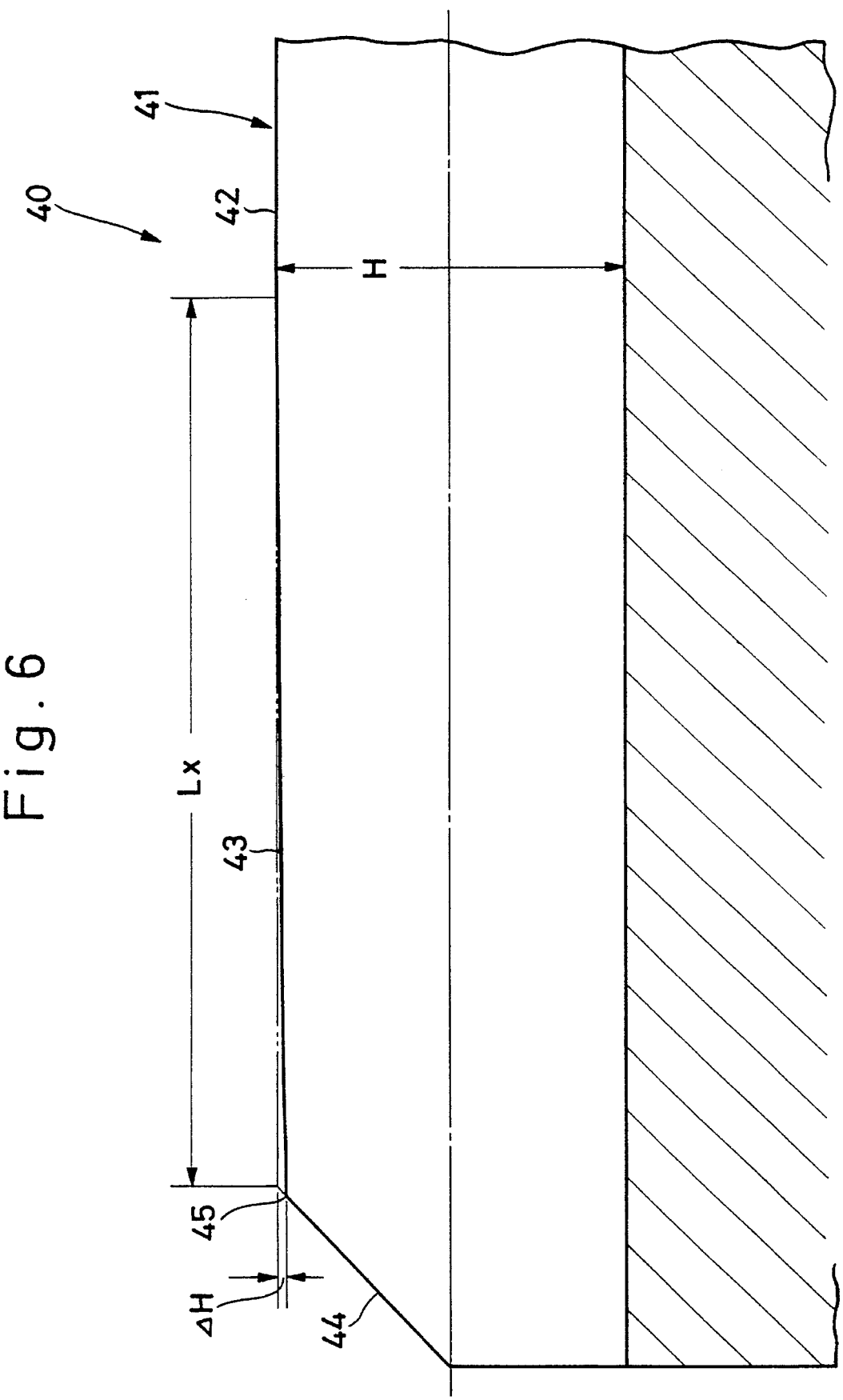

5,620,389

PARALLEL-AXIS DIFFERENTIAL

BACKGROUND OF THE INVENTION

This invention relates to a parallel-axis differential having side gears and planetary gears in parallel with the side gears.

As disclosed in U.S. Pat. No. 5,194,054, the parallel-axis differential for vehicles includes a housing rotationally driven by an engine, a pair of side gears rotatably received in and coaxial with the housing, and at least one pair (usually, three or four pairs) of planetary gears rotatably supported within the housing and being in parallel relation with the side gears. The paired planetary gears are in engagement with the pair of side gears, respectively, and also in engagement with each other. The pair of side gears are connected to end portions of a pair of coaxial output shafts, respectively.

In the differential thus constructed, pockets extending in parallel with the axis of the housing are formed in an inner periphery of the housing. The planetary gears are received in the pockets, respectively. For differential rotation, the planetary gears are rotated with outer peripheral surfaces (top faces of teeth) being in contact with inner peripheral surfaces of the pockets, respectively. At that time, since each planetary gear receives a perpendicular force to its axis from the side gears and the other planetary gear, each planetary gear is rotated while fractionally contacting the inner peripheral surface of the pocket. Owing to this friction, torque transmitting from the housing to the low-speed rotating side gears becomes larger than that of the high-speed rotating side gears.

In the above-mentioned differential, since the perpendicular force to the axis is not uniformly applied to each planetary gear over its entire length, each planetary gear is slightly inclined to the extent of minor play. As a consequence, edges of teeth located on one end of each planetary gear are brought into contact with the inner peripheral surface of the pocket in a very small contact area. The edges of the teeth are formed on the boundary area between top faces of the teeth and end faces of the teeth. Since each planetary gear is rotated relative to the housing in that contacting state, the teeth of the planetary gear and the inner peripheral surface are worn.

SUMMARY OF THE INVENTION

It is, therefore, an object of the present invention to provide a parallel-axis differential, in which wear of planetary gears and wear of inner peripheral surfaces of pockets of a housing can be minimized.

According to the present invention, there is provided a parallel-axis differential, comprising:

(a) a housing rotatable about a rotational axis upon receipt of a rotational torque, the housing having at least a pair of pockets formed in an inner periphery thereof in mutually adjacent relation and extending in parallel with the rotational axis, an inner peripheral surface of each of the pockets being cylindrical;

(b) a pair of side gears rotatably received in the housing and coaxial with the housing, the pair of side gears being connected to end portions of a pair of coaxial output shafts, respectively;

(c) at least a pair of planetary gears rotatably received in the pair of pockets of the housing and being parallel with the rotational axis of the housing, the pair of planetary gears being in engagement with the pair of side gears respectively and also in engagement with each other, the planetary gears being rotated relative to the housing with top faces of teeth of the planetary gears being in contact with the inner peripheral surfaces of the pockets; and (d) end portions of the teeth located on opposite end portions of each of the planetary gears being gradually reduced in height toward ends of the planetary gear so that top faces of the end portions of the teeth located on opposite end portions of each of the planetary gears are gently-sloping convexly-curved faces and are provided as contact faces which are brought into contact with the inner peripheral surfaces of the pockets when the planetary gears are slightly inclined.

BRIEF DESCRIPTION OF THE DRAWINGS

FIG. 6 is an enlarged sectional view showing the shape of the end portions of the teeth of the planetary gear.

DETAILED DESCRIPTION OF THE EMBODIMENT

Figure 1:
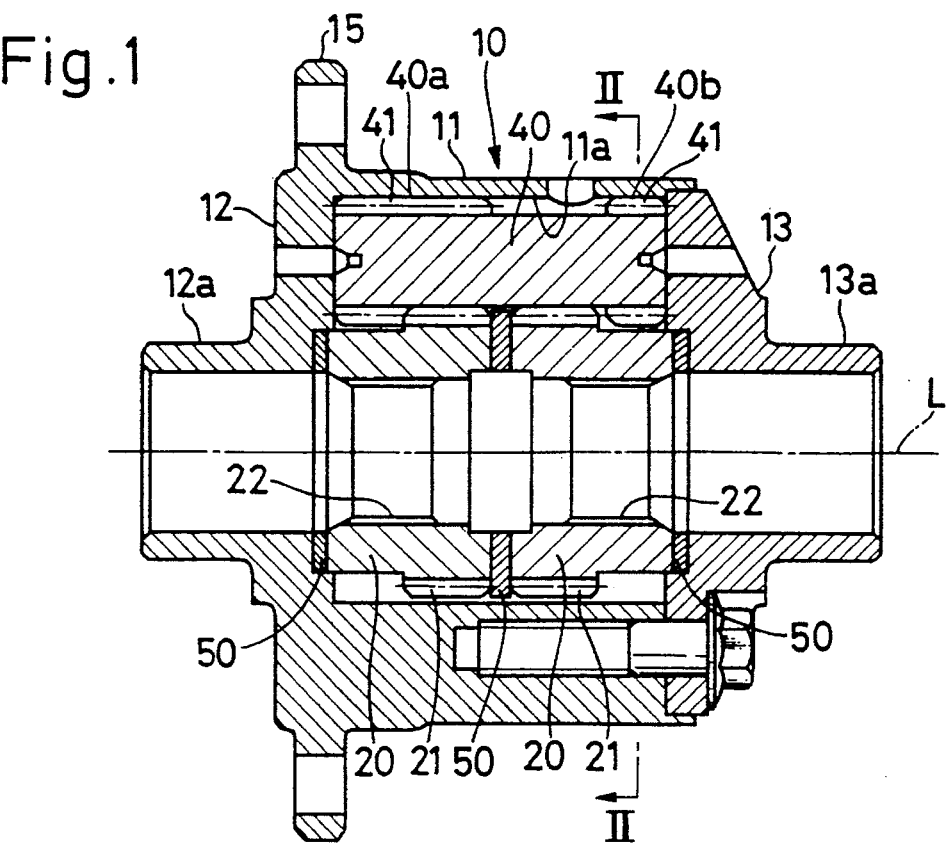
FIG. 1 is a vertical sectional view of a differential for vehicles according to one embodiment of the invention.
Figure 2:
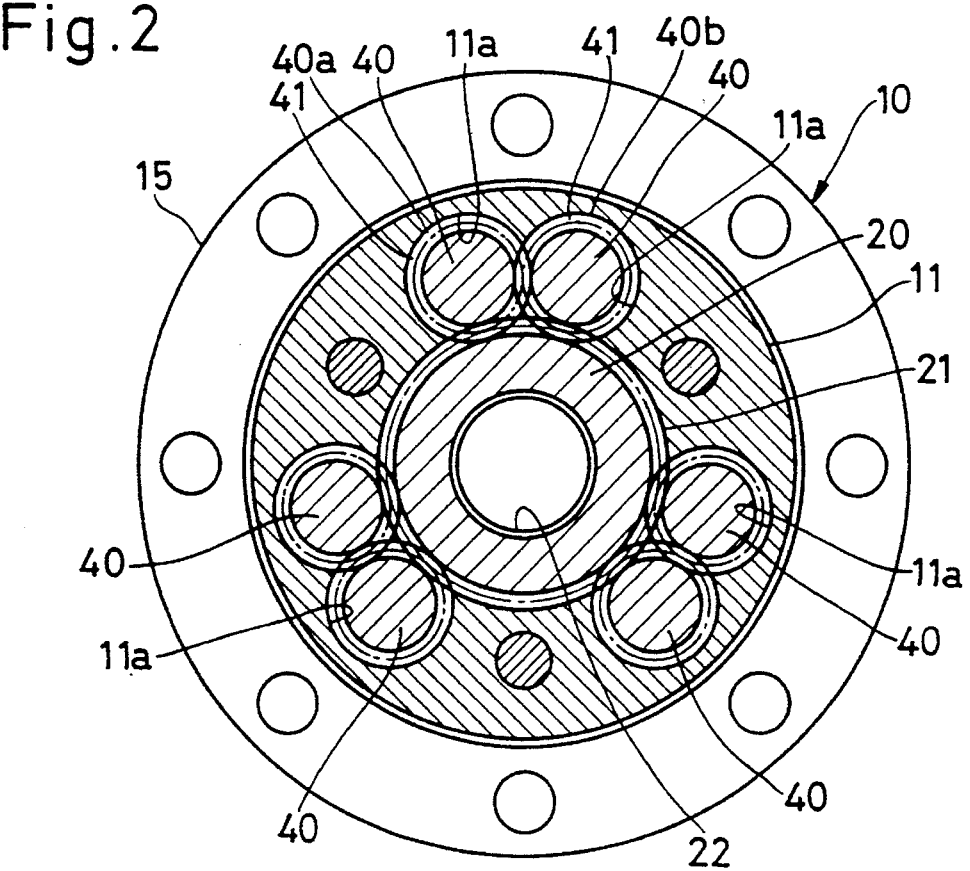
FIG. 2 is a sectional view taken on line II—II of FIG. 1.
Figure 3:
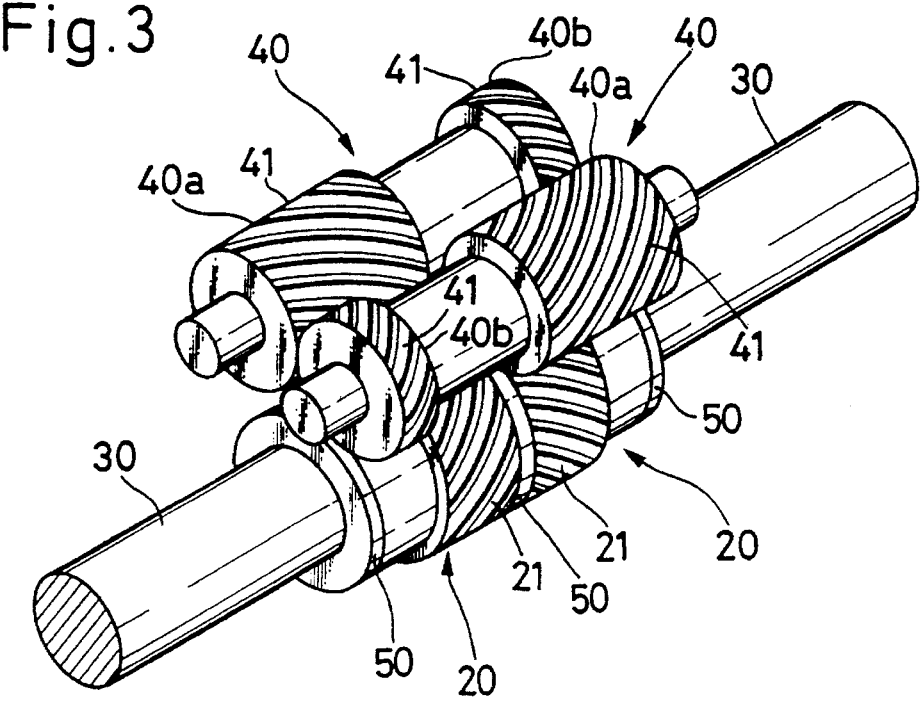
FIG. 3 is a perspective view of a general construction of an important portion of the differential. In this Figure, a housing is omitted and only one pair of planetary gears are shown.

One embodiment of the present invention will now be described with reference to FIGS. 1 to 6. As shown in FIGS. 1 to 3, a parallel-axis differential for vehicles includes a housing 10. This housing 10 includes a sleeve portion 11, an end wall 12 integral with one end of the sleeve portion 11, and a closure 13 for closing an opening in the other end of the sleeve portion 11. The end wall 12 and closure 13 of the housing 10 are formed with journal portions 12a and 13a, respectively. The housing 10 is rotatably supported about an axis L through the journal portions 12a and 13a carried on bearings. A flange portion 15 is formed on the above-mentioned one end of the sleeve portion 11 of the housing 10. A ring gear (not shown) is secured to this flange portion 15. The housing 10 receives a driving torque from an engine through the ring gear and a gear which is in engagement with the ring gear.

A pair of cylindrical side gears 20 are rotatably received in and coaxial with the housing 10. The side gears 20 have helical teeth 21 on their outer peripheries, respectively. The helical teeth 21 of the pair of side gears 20 are equal to each other in helical angle. The helical direction of the helical teeth 21 of the pair of side gears 20 may be arranged in a reverse direction or in a same direction.

A pair of axles 30 (output shafts) extend through the journal portions 12a and 13a, with end portions thereof spline-connected to spline portions 22 of the pair of side gears 20, respectively.

Three pairs of pockets 11a are formed in an inner peripheral surface of the sleeve portion 11 of the housing 10 at equal spaces in the circumferential direction. The paired pockets 11a are adjacent to each other. An inner peripheral surface of each pocket 11a is cylindrical. Planetary gear pairs 40 are rotatably received in the pocket pairs 11a, respectively. The planetary gears 40 are in parallel relation with an axis L of the housing 10. Each of the planetary gears 40 has a long first portion 40a and a short second portion 40b on opposite ends thereof. Helical teeth 41 are formed on outer peripheries of the first and second portions 40a, 40b, respectively.

As best shown in FIG. 3, the first portion 40a of one of the planetary gears 40 is in engagement with one of the side gears 20, and also with the second portion 40b of the other planetary gear 40. Similarly, the first portion 40a of the other planetary gear 40 is in engagement with the other side gear 20 and also with the second portion 40b of the above-mentioned one of the planetary gears 40.

Thrust washers 50 are arranged between the end wall 12 of the housing 10 and one of the side gears 20, between the pair of side gears 20, and between the other side gear 20 and the closure 13 of the housing 10, respectively.

Figure 4:
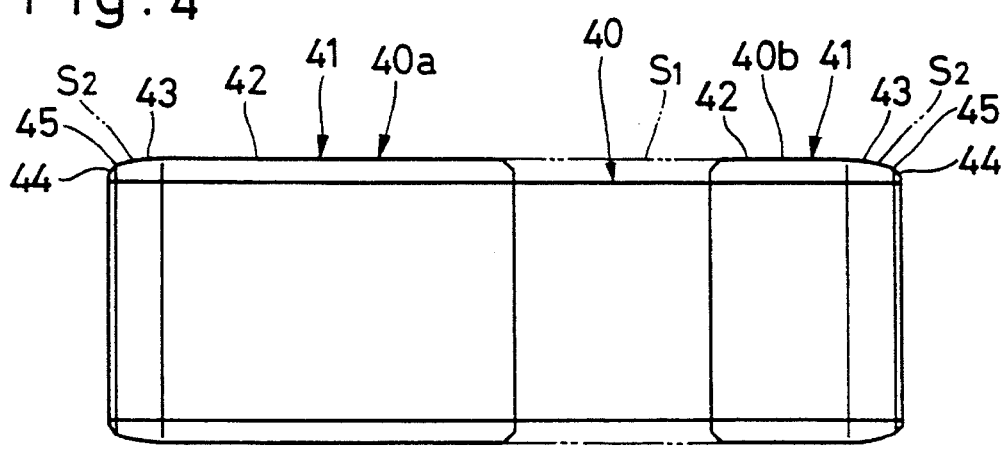
FIG. 4 is a side view of the planetary gear, in which features of its shape at end portions are shown in an exaggerated fashion.

The above-mentioned construction is basically the same to that of the conventional parallel-axis differential for vehicles. As shown in FIG. 4 in an exaggerated fashion, top faces 43 of end portions of the helical teeth 41 located on opposite end portions of the planetary gear 40 are on imaginary convexly-curved surfaces $S_2$, respectively, whereas top faces 42 of the other parts of the helical teeth 41 are on an imaginary cylindrical surface $S_1$. Ends of the top faces 43 of the helical teeth 41 are crossed with end faces 44 which are inclined 45 degrees, and edges 45 are formed in their boundary areas, respectively.

Figure 5:
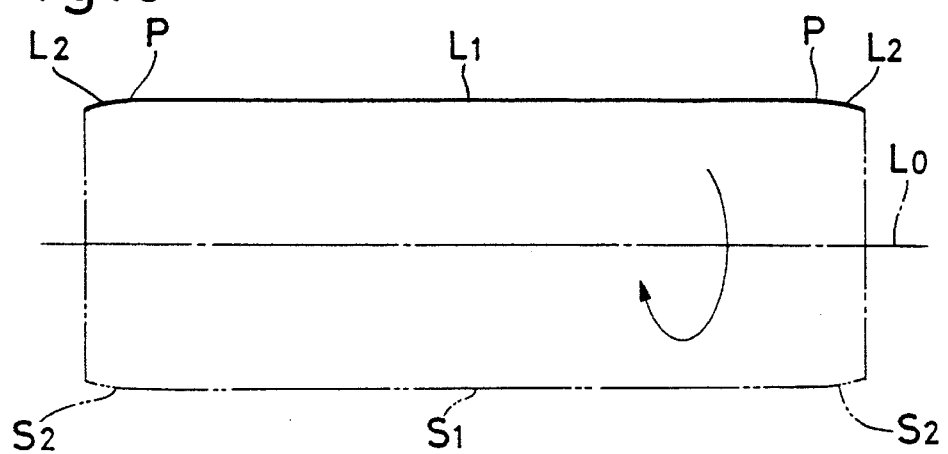
FIG. 5 is a view showing an imaginary carved-line which determines the shape of top surfaces of teeth of the planetary gear.

As shown in FIG. 5, the imaginary cylindrical surface $S_1$ and two imaginary convexly-curved surfaces $S_2$ are obtained by rotating an imaginary straight line $L_1$ and imaginary curved-lines $L_2$ about an axis $L_0$ of the planetary gear 40. The imaginary straight line $L_1$ is in parallel relation with the axis $L_0$ of the planetary gear 40 and imaginary curved-lines $L_2$ are connected to opposite ends of the imaginary straight line $L_1$. The imaginary curved-lines $L_2$ are coplanar with the axis $L_0$ and imaginary straight line $L_1$. Each of the imaginary curved-lines $L_2$ is formed of a part of a true circle or a part of an ellipse.

A radius of curvature of each of the imaginary curved-lines $L_2$ is much larger than a radius of the planetary gear 40, i.e., from about several times a dozen to about 200 times the latter. The imaginary straight line $L_1$ extends in a tangential direction of the imaginary curved-lines $L_2$ at connecting points P between the imaginary curved-lines $L_2$ and the imaginary straight line $L_1$. As a consequence, as best shown in FIG. 6, the top face 43 of one end portion of the helical tooth 41 is smoothly connected to the top faces 42 of other parts thereof such that the top faces 43 are outwardly slightly convexed. The height H of the end portion of the helical tooth 41 is gradually reduced toward the edge 45 of the planetary gear 40.

The shape of the end portion of the helical tooth 41 will be described by way of concrete numerical values, with reference to FIG. 6. Presuming that the diameter of the planetary gear 40 is 2 cm to 3 cm, the height of the helical tooth 41 is 3 mm to 4 mm, and an axial length Lx of the end portion of the helical tooth 41 having the convexly-curved top face 43 is 5 mm to 10 mm, the reduced portion H of the height at the edge 45 is so small as 0.05 mm to 0.10 mm.

In the differential thus constructed, when the housing 10 is rotationally driven, each planetary gear 40 receives a perpendicular force to the axis $L_0$ because of its engagement with the side gear 20 and the other planetary gear 40. At that time, the planetary gear 40 is slightly inclined relative to the pocket 11a to the extent of minor play. At that time, unlike the conventional device, the edge 45 of the planetary gear 40 is not in contact with the inner peripheral surface of the pocket 11a, and the top faces 43 of the helical teeth 41 located on one of the opposite end portions of the planetary gear 40 are brought into contact with the inner peripheral surface of the pocket 50. The reason is that the height H of the end portion of the helical tooth 41 is gradually reduced and the top face 43 is slightly convexly curved. Since a contact area between the top faces 43 and the inner peripheral surface of the pocket 11a is much larger when compared with the case in which the edges 45 are brought into contact with the inner peripheral surface of the pocket 11a, a contact pressure can be reduced. As a consequence, when the planetary gear 40 is rotated relative to the housing 10, wear of the inner peripheral surface of the pocket 11a and wear of the planetary gear 40 can be minimized.

The present invention is not limited to the above embodiment and many changes can be made. The end face of the helical tooth crossing the top face of the helical tooth may be inclined perpendicular to the axis of the planetary gear instead of 45 degrees.

What is claimed is:

1. a parallel-axis differential, comprising:

(a) a housing rotatable about a rotational axis upon receipt of a rotational torque, said housing having at least a pair of pockets formed in an inner periphery thereof in mutually adjacent relation and extending in parallel with said rotational axis, an inner peripheral surface of each of said pockets being cylindrical;

(b) a pair of side gears rotatably received in said housing and coaxial with said housing, said pair of gears being connected to end portions of a pair of coaxial output shafts, respectively;

(c) at least a pair of planetary gears rotatably received in said pair of pockets of said housing and being parallel with said rotational axis of said housing, said pair of planetary gears being in engagement with said pair of side gears respectively and also in engagement with each other, said planetary gears being rotated relative to said housing with top faces of teeth of said planetary gears being in contact with the inner peripheral surfaces of said pockets; and (d) end portions of said teeth located on opposite end portions of each of said planetary gears being gradually reduced in height toward ends of said planetary gear so that top faces of said end portions of said teeth comprise gently-sloping convexly-curved faces, said convexly-curved top faces of the end portions of the teeth intersect end faces of the teeth to form edges, with said convexly-curved top faces of the end portions of the teeth being brought into contact with the inner peripheral surfaces of said pockets to thereby prevent said edges of the teeth from coming into contact with the inner peripheral surfaces of the pockets when said planetary gears are slightly inclined.

2. The differential according to claim 1, in which when an imaginary cylindrical surface and imaginary convexly-curved surfaces connected to opposite ends thereof are imagined, said top faces of the end portions of said teeth are located on said imaginary convexly-curved surfaces, whereas top faces of other parts of said teeth are located on said imaginary cylindrical surface, said imaginary cylindrical surface and imaginary convexly-curved surfaces being obtained by rotating an imaginary straight line and imaginary curved-lines about an axis of said planetary gear, said imaginary straight line being in parallel relation with the axis of said planetary gear, said imaginary curved-lines being connected to opposite ends of said imaginary straight line.

3. The differential according to claim 2, in which said imaginary straight line extends in a tangential direction of each of said imaginary curved-lines at a connecting point between each of said imaginary curved-lines and said imaginary straight line, a radius of curvature of each of said imaginary curved-lines being much larger than a radius of each of said planetary gears.

4. The differential according to claim 3, in which each of said imaginary curved-lines is a part of a true circle.

5. The differential of claim 1, wherein the end faces of the teeth are inclined with respect to an axis of the planetary gear.

\* \* \* \* \*

UNITED STATES PATENT AND TRADEMARK OFFICE
CERTIFICATE OF CORRECTION

PATENT NO. : 5,620,389

DATED : April 15, 1997

INVENTOR(S) : Hideyuki SATO

It is certified that error appears in the above-identified patent and that said Letters Patent is hereby corrected as shown below:

Column 3, line 62, replace "H" with --$\Delta$H--.

Signed and Sealed this

Eighth Day of July, 1997

Attest:

BRUCE LEHMAN

*Attesting Officer*     *Commissioner of Patents and Trademarks*